United States Patent
Tiennot

(10) Patent No.: US 7,689,758 B2
(45) Date of Patent: Mar. 30, 2010

(54) DUAL BUS MATRIX ARCHITECTURE FOR MICRO-CONTROLLERS

(75) Inventor: Renaud Tiennot, Aix En Provence (FR)

(73) Assignee: Atmel Corporation, San Jose, CA (US)

(*) Notice: Subject to any disclaimer, the term of this patent is extended or adjusted under 35 U.S.C. 154(b) by 82 days.

(21) Appl. No.: 11/776,916

(22) Filed: Jul. 12, 2007

(65) Prior Publication Data

US 2009/0019207 A1    Jan. 15, 2009

(51) Int. Cl.
G06F 13/36    (2006.01)
G06F 13/20    (2006.01)
G06F 13/00    (2006.01)

(52) U.S. Cl. .................. 710/317; 710/306; 710/313; 710/316

(58) Field of Classification Search .................. 710/317, 710/306, 313, 316
See application file for complete search history.

(56) References Cited

U.S. PATENT DOCUMENTS

| | | | |
|---|---|---|---|
| 4,933,835 A | 6/1990 | Sachs et al. | |
| 5,091,850 A | 2/1992 | Culley | |
| 5,157,774 A | 10/1992 | Culley | |
| 5,438,666 A | 8/1995 | Craft et al. | |
| 5,450,551 A | 9/1995 | Amini et al. | |
| 5,581,714 A | 12/1996 | Amini et al. | |
| 5,710,906 A | 1/1998 | Ghosh et al. | |
| 5,761,443 A | 6/1998 | Kranich | |
| 5,813,036 A | 9/1998 | Ghosh et al. | |
| 5,859,651 A * | 1/1999 | Potu | 345/538 |
| 6,405,291 B1 | 6/2002 | Ghosh et al. | |
| 6,553,446 B1 | 4/2003 | Miller | |
| 6,760,802 B2 | 7/2004 | Jahnke et al. | |
| 6,775,732 B2 | 8/2004 | Jahnke et al. | |
| 6,829,669 B2 | 12/2004 | Jahnke et al. | |
| 6,859,852 B2 | 2/2005 | Jahnke et al. | |

(Continued)

FOREIGN PATENT DOCUMENTS

WO    WO-2009/009133 A2    1/2009

OTHER PUBLICATIONS

"International Application Serial No. PCT/US2008/008542, Search Report mailed Dec. 30, 2008".

(Continued)

Primary Examiner—Mark Rinehart
Assistant Examiner—Jeremy S Cerullo
(74) Attorney, Agent, or Firm—Schwegman, Lundberg & Woessner, P.A.

(57) ABSTRACT

A dual bus matrix architecture comprising: a first interconnect matrix connected to a plurality of high performance peripherals and having a plurality of master ports and a plurality of slave ports; a second interconnect matrix connected to a plurality of limited bandwidth peripherals and having a plurality of master ports and a plurality of slave ports; and a shared multiport controller connected to one (or more) of the slave ports of the first interconnect matrix and to one (or more) of the master ports of the second interconnect matrix, wherein the shared multiport controller controls accesses to the high performance peripherals and the limited bandwidth peripherals by directing accesses to the high performance peripherals through the first interconnect matrix and accesses to the limited bandwidth peripherals through the second interconnect matrix.

16 Claims, 3 Drawing Sheets

U.S. PATENT DOCUMENTS

| | | |
|---|---|---|
| 6,940,311 B2 | 9/2005 | Saitoh |
| 7,043,209 B2 * | 5/2006 | Hirota ........................ 455/101 |
| 2002/0032820 A1 | 3/2002 | Jahnke et al. |
| 2002/0052995 A1 | 5/2002 | Jahnke et al. |
| 2002/0052996 A1 | 5/2002 | Jahnke et al. |
| 2004/0139245 A1 | 7/2004 | Ghosh et al. |
| 2005/0102455 A1 | 5/2005 | Saitoh |
| 2006/0010260 A1 | 1/2006 | Fung |
| 2007/0233429 A1 | 10/2007 | Vergnes et al. |

OTHER PUBLICATIONS

"International Application Serial No. PCT/US2008/008542, Written Opinion mailed Dec. 30, 2008".

Mitic, M., et al., "An overview of On- chip buses", *Facta universitatis*, vol. 19(3), (2006), 405-428.

Pasricha, S., et al., "Bus matrix communication architecture synthesis", *Center for embedded computer systems*, University of California Irvine, (2005).

* cited by examiner

DUAL BUS MATRIX ARCHITECTURE FOR MICRO-CONTROLLERS

BACKGROUND OF THE INVENTION

1. Field of the Invention

The present invention relates to microcontrollers. More specifically, the present invention relates to a dual bus matrix architecture for microcontrollers.

2. Background

The increasing number of peripherals connected onto a system bus creates routability problems. Moreover, the data path size of peripherals may not be the same due to their different inherent bandwidth requirements. When interconnecting all of these heterogeneous peripherals to the same bus matrix, it may be difficult to match all the requirements. These requirements may include, but are not limited to, maximum frequency and routability. Although, wrapper logic may be added, it can lead to a reduction in performance.

Currently, high-end microcontrollers use a single bus matrix because it is sufficient to cover the needs of today's applications. However, increasing demands for portable multimedia applications require more peripherals of heterogeneous bandwidth requirements and different clock frequencies to achieve appropriate bandwidth with optimal power consumption.

SUMMARY

The present invention takes place in a microcontroller integrated circuit where a microprocessor is configured to perform accesses to many peripheral circuitries. These accesses are performed by means of system bus. The peripherals may act as masters or slaves on the system bus. In order to provide maximum flexibility of the connections while keeping routability between all these peripherals, a dual bus matrix is employed. A first matrix is used to directly connect peripherals of very high bandwidth, while a second matrix is used to connect peripherals having limited bandwidth requirements. A slave port of one matrix may act as a master port of the other matrix in order to maintain communications between peripherals of both matrices.

This dual bus matrix architecture enhances the routability beyond a single bus matrix because the bandwidth is not at the maximum for all peripheral connections. Rather, the bandwidth is just what is required. The microprocessor may increase the MIPS (Million Instructions Per Second) when a software application so requires, such as with a lot of off-chip or on-chip memory accesses. This is possible because limited number of peripherals may interfere directly on the same bus.

In one aspect of the present invention, a dual bus matrix architecture is disclosed comprising a first interconnect matrix connected to a plurality of high performance peripherals and having a plurality of master ports and a plurality of slave ports, and a second interconnect matrix connected to a plurality of limited bandwidth peripherals and having a plurality of master ports and a plurality of slave ports. The architecture further comprises a shared multiport controller connected to one (or more) of the slave ports of the first interconnect matrix and to one (or more) of the slave ports of the second interconnect matrix The shared multiport controller is accessed at the same by all master peripherals. Both limited bandwidth peripherals and high performance peripherals can access the shared memory through the multiport memory controller. The role of the multiport controller is to schedule high performance (64 bit) accesses and limited bandwidth peripheral (32 bit) accesses to optimize the shared memory.

In another aspect of the present invention a method for accessing peripherals is disclosed. A shared multiport controller determines whether an access is required to either a high performance peripheral or a limited bandwidth peripheral. The shared multiport controller is connected to one (or more) of a plurality of slave ports of a first interconnect matrix and to one (or more) of a plurality of slave ports of a second interconnect matrix. The first interconnect matrix is connected to a plurality of high performance peripherals and further comprises a plurality of master ports. The second interconnect matrix is connected to a plurality of limited bandwidth peripherals and further comprises a plurality of master ports. If access is required by one of the plurality of high performance master peripherals, the shared multiport controller directs an access to the shared memory through the first interconnect matrix when the shared resource is not busy. If access is required by one of the plurality of limited bandwidth master peripherals, the shared multiport controller directs that access to the shared memory of limited bandwidth peripherals through the second interconnect matrix when the shared resource is not busy.

As a result of the present invention, routability is enhanced. Furthermore, there is no need to redesign peripherals when the data path size is increased, nor to add a wrapper logic to fit the new data path size, nor to redesign the peripherals to prevent performance reduction.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

Figure 1:
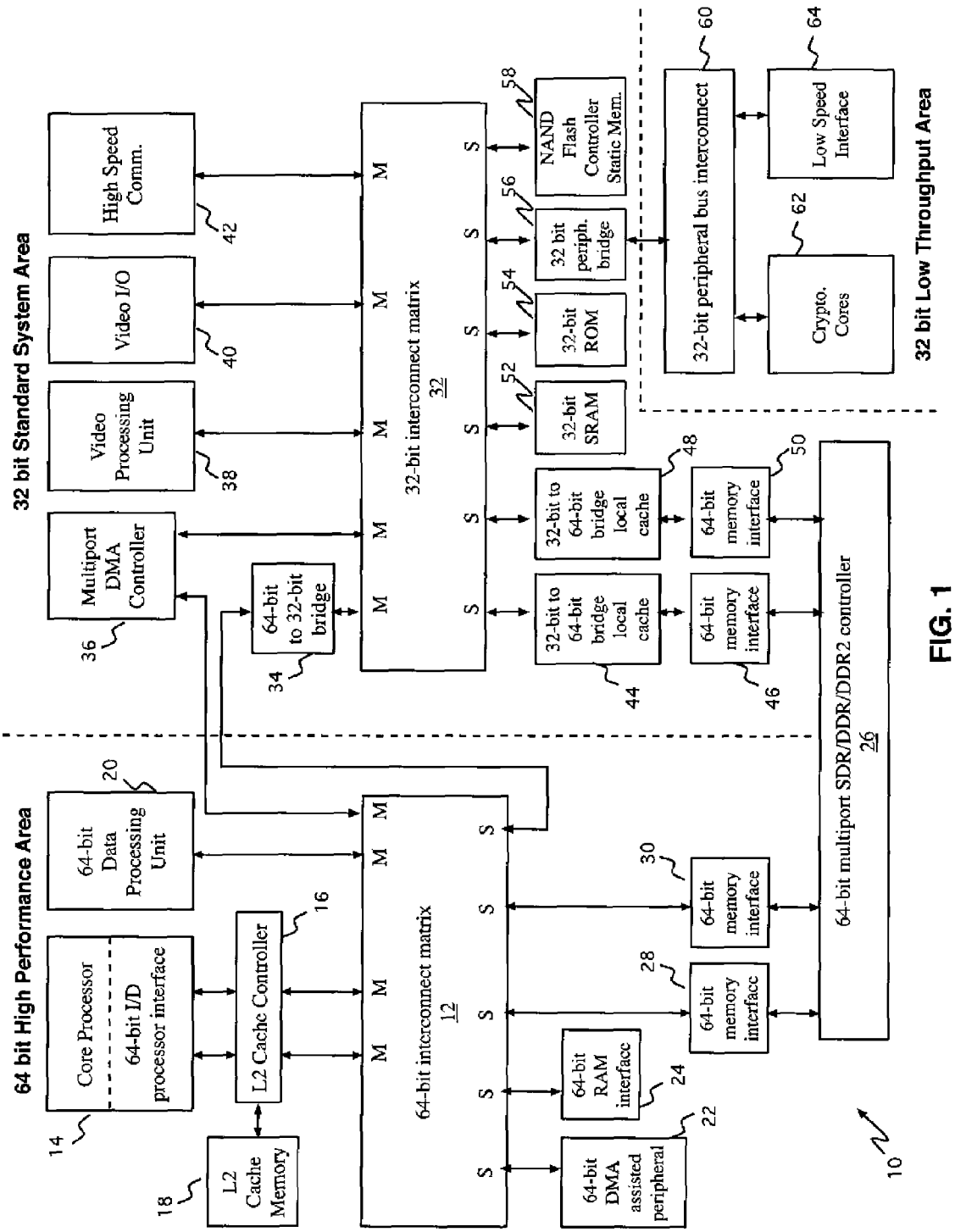
FIG. 1 is a schematic diagram of an exemplary dual bus matrix architecture in accordance with the principles of the present invention.

FIG. 1 is a schematic diagram of exemplary dual bus matrix architecture 10 in accordance with the principles of the present invention. The architecture 10 may be divided into three different areas. The first area is a high performance area, such as the 64-bit high performance area shown in FIG. 1. The second area is a standard system area, such as the 32-bit standard system area shown in FIG. 1. The third area is a low throughput area, such as the 32-bit low throughput area shown in FIG. 1.

The high performance area comprises a first interconnect matrix 12, such as a 64-bit AHB (AMBA High-Performance Bus). First interconnect matrix 12 has a plurality of master ports (M) and slave ports (S) and is used to directly connect peripherals of very high bandwidth. The high performance area preferably includes a processor 14, such as a 64-bit core processor (for example, ARM1176). Processor 14 is connected to two master ports (one instruction port and one for data port) of first matrix 12. As seen in FIG. 1, a cache controller 16 may be connected in between processor 14 and first matrix 12. In an exemplary embodiment, cache controller 16 is an L2 cache controller connected to an L2 cache memory 18.

The high performance area may also include a 64-bit data processing unit 20 connected to one of the master port of first matrix 12, a 64-bit direct memory access (DMA) assisted peripheral 22 connected to one of the master ports of first matrix 12, and a 64-bit RAM interface 24 connected to one of the slave ports of first matrix 12.

A multiport controller 26 is connected to at least one of the slave ports of first matrix 12. As seen in FIG. 1, one port of controller 26 may be connected to one of the slave ports of first matrix 12 through a 64-bit memory interface 28, while another port of controller 26 may be connected to another slave port of first matrix 12 through another 64-bit memory interface 30. In a preferred embodiment, multiport controller 26 is a 64-bit multiport SDR/DDR/DDR2 controller.

The standard system area comprises a second interconnect matrix 32, such as a 32-bit AHB. Second interconnect matrix 32 has a plurality of slave ports (S) and master ports (M). A slave port of that matrix may be connected to an AHB master port of an AHB master peripheral. Respectively, a master port of that matrix may be connected to an AHB slave port of an AHB slave peripheral. The second interconnect matrix is used to connect peripherals having limited bandwidth requirements. In a preferred embodiment, a slave port of second interconnect matrix 32 may be connected to a slave port of the first interconnect matrix 12. This connection may be made through a bridge 34, such as a 64-bit to 32-bit downsizer. In this configuration, the master port of the second interconnect matrix 32 may act as a slave port of first interconnect matrix 12 in order to maintain communication between peripherals of both matrices.

Second interconnect matrix 32 may have another master port connected to a multiport DMA controller 36. In an exemplary embodiment, multiport DMA controller 36 is also connected to a master port of first interconnect matrix 12.

Yet another master port of second interconnect matrix 32 may be connected to a video processing unit 38. In an exemplary embodiment, video processing unit may comprise a universal video decoder and/or a graphics accelerator.

Second interconnect matrix 32 may also have a master port used as a video input/output 40 for connection to video devices. Such devices may include, but are not limited to a camera interface and an LCD controller.

Another master port of second interconnect matrix 32 may be connected to devices used for high-speed communication 42, such as Ethernet, Universal Serial Bus (USB), and Serial ATA (SATA).

Multiport controller 26 is connected to at least one of the slave ports of second matrix 32. The multiport memory controller acts as a slave peripheral. As seen in FIG. 1, one port of controller 26 may be connected to one of the slave ports of second matrix 32 through a 32-bit to 64-bit bridge local cache 44 and a 64-bit memory interface 46, while another port of controller 26 may be connected to another slave port of second matrix 32 through another 32-bit to 64-bit bridge local cache 48 and another 64-bit memory interface 50.

The slave ports of second interconnect matrix 32 may also be connected to memory devices. Such memory devices may include, but are not limited to, a 32-bit SRAM 52, a 32-bit ROM 54, and a NAND flash controller 58.

Second interconnect matrix 32 can also be connected to the low throughput area. In an exemplary embodiment, one of the slave ports of second interconnect matrix 32 is connected to a peripheral bus interconnect 60 in the low throughput area through a 32-bit peripheral bridge 56. In a preferred embodiment, peripheral bus interconnect 60 is a 32-bit peripheral bus interconnect.

Peripheral bus interconnect 60 may be connected to a plurality of low throughput components. These low throughput components may include, but are not limited to, cryptography cores 62 and low speed interfaces 64. Examples of cryptography cores 62 include Advanced Encryption Standard (AES) and Data Encryption Standard (DES), while examples of low speed interfaces 64 include a Universal Asynchronous Receiver-Transmitter (UART), which is a computer component that handles asynchronous serial communication, and a Serial Peripheral Interface, which is a synchronous serial interface for connecting low/medium-bandwidth external devices.

Figure 2:
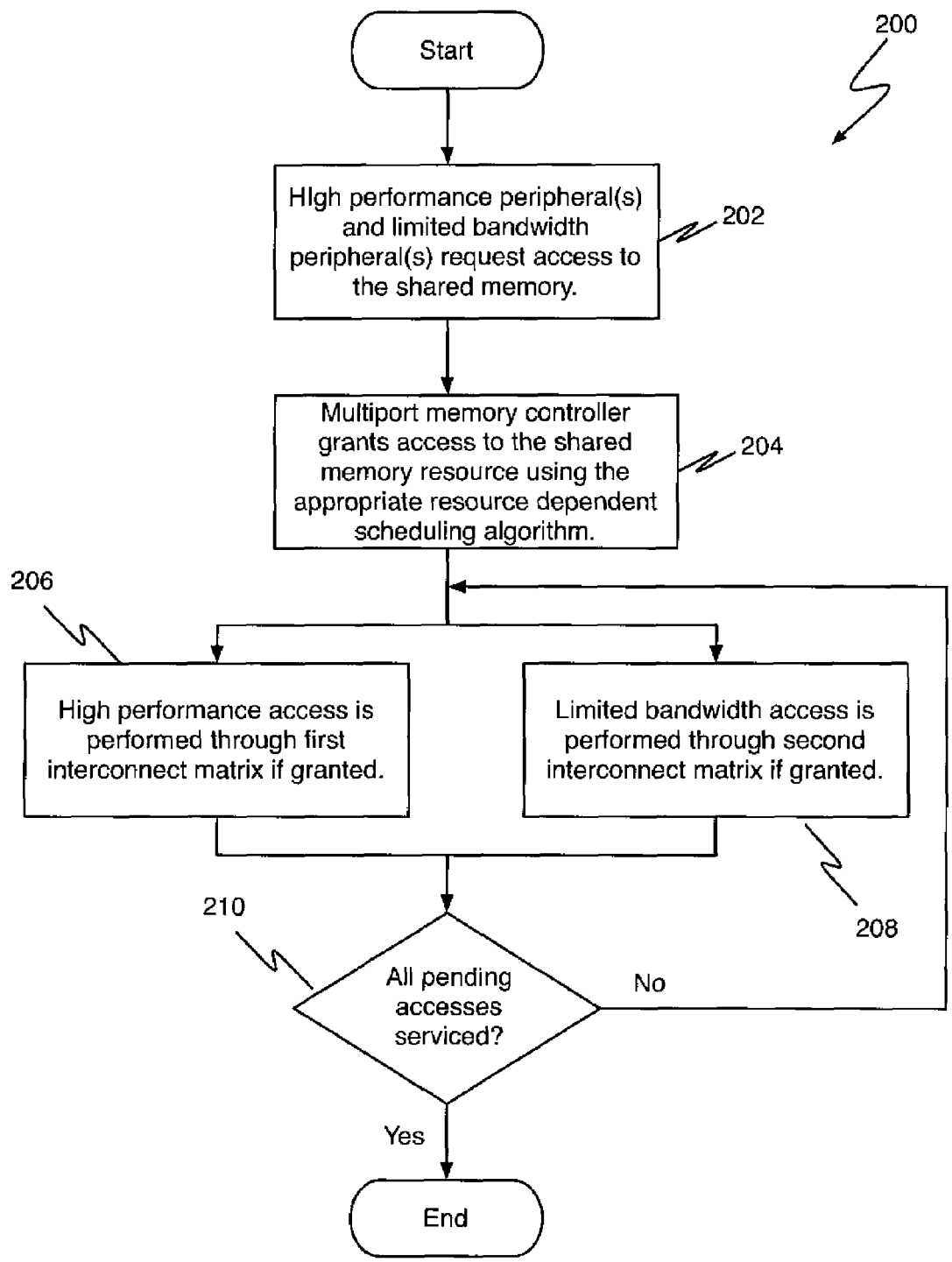
FIG. 2 is a flowchart of an exemplary method for accessing shared memory resources of peripherals in accordance with the principles of the present invention.

FIG. 2 is a flowchart of an exemplary method 200 for accessing the shared memory resource in accordance with the principles of the present invention. At step 202, both high performance master peripherals and limited performance peripherals may request from the multiport memory controller access to the shared memory resource through their respective matrices. At step 204, the multiport memory controller grants access to the shared resource. An appropriate resource-dependent scheduling algorithm is used to sort and find the highest pending request among all master requests (if several requests are active at the same time). Then, the access is performed and a chunk of data is read from or written to the shared memory. At step 206, high performance access is performed through the first interconnect matrix if access is granted. At step 208, limited bandwidth access is performed through the second interconnect matrix if access is granted. Depending on the scheduling algorithm, more of less bandwidth is available for high performance master peripheral and limited bandwidth master peripheral. While accesses are pending, the multiport controller arbitrates between requests until all (both high performance and limited bandwidth) masters are serviced. At step 210, it is determined whether or not all pending accesses have been serviced. If they have not all been serviced, then the process continues to arbitrate between requests. If all pending accesses have been serviced, then the process comes to an end.

The present invention uses a shared memory controller to avoid the bottlenecks commonly found in the bridges of the prior art. Whereas the architectures of the prior art can be described as being bridge-centric, the architecture of the present invention is centered around the shared memory controller. This design helps provide maximum flexibility of the connections, while maintaining routability between all of the peripherals. If an additional high performance master is required, first interconnect matrix 12 is simply updated by adding a master port. Similarly, if an additional limited bandwidth master, such as a 32-bit standard master, is required, second interconnect matrix 32 is simply updated by adding a master port. There is no need in either situation to add a bridge or a bus.

Figure 3:
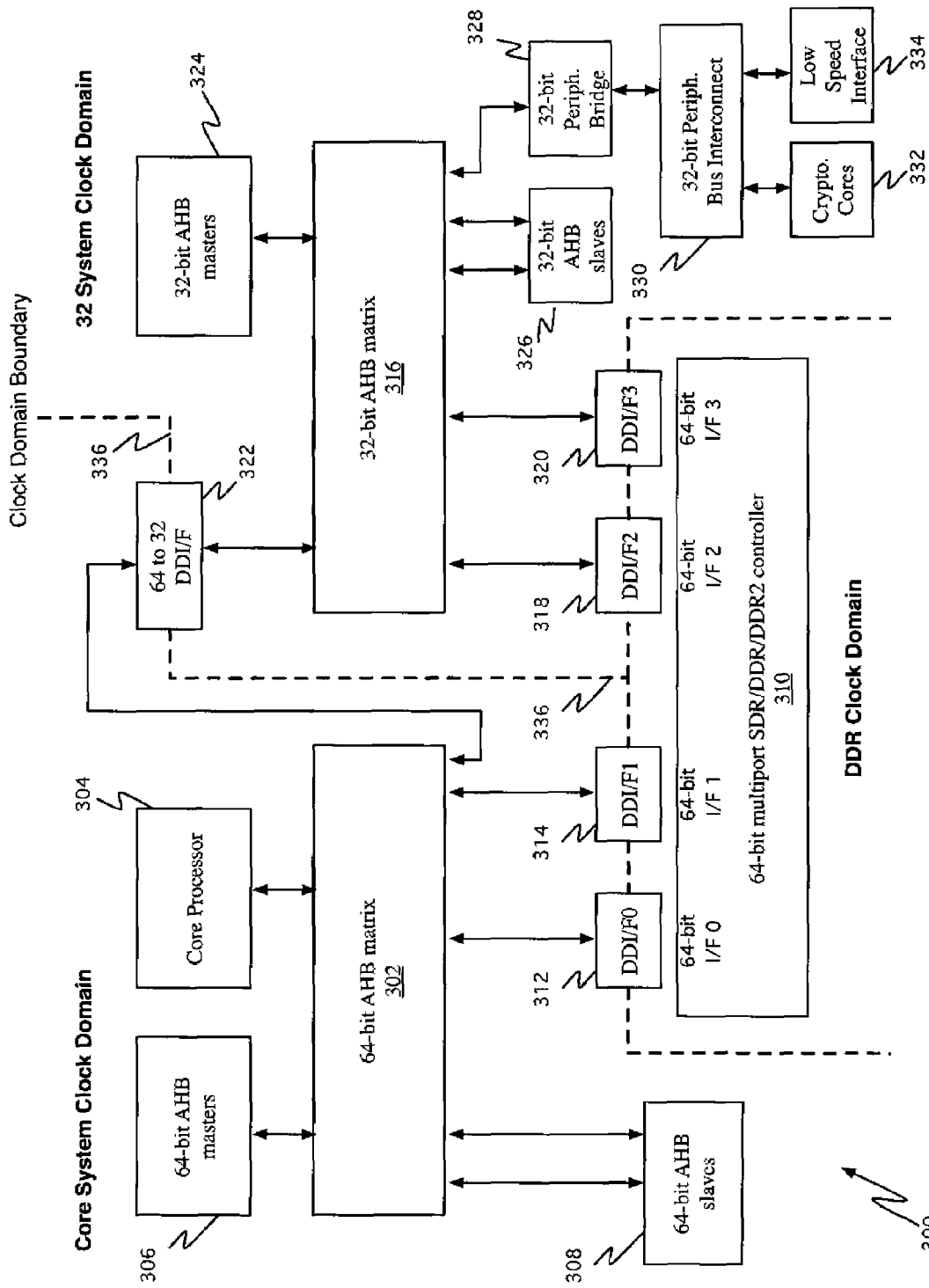
FIG. 3 is a schematic diagram of another exemplary dual bus matrix architecture illustrating the clock domain boundary in accordance with the principles of the present invention.

While the different clock domains in the architecture of the present invention may be synchronous, they may alternatively be asynchronous. FIG. 3 is a schematic diagram of another exemplary dual bus matrix architecture 300 illustrating the clock domain boundary in accordance with the principles of the present invention. Dotted line 336 illustrates the boundary between the DDR Clock Domain for the multiport shared memory controller, the Core System Clock Domain for 64-bit high performance, and the 32 System Clock Domain for the 32-bit standard system area.

The Core System Clock Domain comprises a first interconnect matrix 302, such as a 64-bit AHB matrix. The Core System Clock Domain also preferably includes a core processor 304 (such as ARM1176), high performance masters 306 (such as 64-bit AHB masters), and high performance slaves 308 (such as 64-bit AHB slaves) connected to first interconnect matrix 302.

The 32 System Clock Domain comprises a second interconnect matrix 316, such as a 32-bit AHB matrix. First interconnect matrix 302 may be connected to second interconnect matrix 316 through a bridge 322, such as a 64-bit to 32-bit Double Domain Interface. The 32 System Clock Domain also preferably comprises standard masters 324 (such as 32-bit AHB masters) and standard slaves 326 (such as 32-bit AHB slaves) connected to second interconnect matrix 316. The 32 System Clock Domain may also comprise a peripheral bus interconnect 330 connected to second interconnect matrix 316 through a 32-bit peripheral bridge 328. In an exemplary embodiment, peripheral bus interconnect 330 is a 32-bit peripheral interconnect. Peripheral bus interconnect 330 may be connected to a plurality of components, such as cryptography cores 332 and low speed interfaces 334.

The DDR Clock Domain comprises a multiport shared memory controller 310, such as a 64-bit multiport SDR/DDR/DDR2 controller. First interconnect matrix 302 is connected to shared memory controller 310, such as through Double Domain Interface 312 for port 0 and Double Domain Interface 314 for port 1. Second interconnect matrix 316 is also connected to shared memory controller 310, such as through Double Domain Interface 318 for port 2 and Double Domain Interface 320 for port 3.

As mentioned above, the different clock domains in the architecture of the present invention may be asynchronous. For example, the Core System Clock Domain may run at 133 Mhz, while the 32 System Clock Domain runs at 100 Mhz and the DDR Clock Domain runs at 200 Mhz. In this embodiment, only a limited region is running at the maximum frequency.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A dual bus matrix microcontroller architecture comprising:
   a first interconnect matrix connected to a plurality of high performance peripherals and having a plurality of master ports and a plurality of slave ports;
   a second interconnect matrix connected to a plurality of limited bandwidth peripherals and having a plurality of master ports and a plurality of slave ports; and
   a shared multiport controller connected to one or more of the slave ports of the first interconnect matrix and to one or more of the slave ports of the second interconnect matrix, wherein the shared multiport controller controls accesses to the high performance peripherals and the limited bandwidth peripherals by directing accesses to the high performance peripherals through the first interconnect matrix and accesses to the limited bandwidth peripherals through the second interconnect matrix.

2. The architecture of claim 1, further comprising a microprocessor configured to perform accesses to the high performance peripherals and to the limited bandwidth peripherals, the microprocessor connected to one of the master ports of the first interconnect matrix.

3. The architecture of claim 2, wherein the microprocessor is a 64-bit core processor.

4. The architecture of claim 1, wherein one of the slave ports of the first interconnect matrix is connected to one of the master ports of the second interconnect matrix.

5. The architecture of claim 4, wherein the one of the slave ports of the first interconnect matrix is connected to one of the master ports of the second interconnect matrix through a bridge.

6. The architecture of claim 5, wherein the bridge is a 64-bit to 32-bit bridge.

7. The architecture of claim 1, wherein the first interconnect matrix is a 64-bit interconnect matrix and the second interconnect matrix is a 32-bit interconnect matrix.

8. The architecture of claim 1, further comprising:
   a first clock domain for the first interconnect matrix and the plurality of high performance peripherals;
   a second clock domain for the second interconnect matrix and the plurality of limited bandwidth peripherals; and
   a third clock domain for the shared multiport controller,
   wherein the first clock domain, the second clock domain, and the third clock domain are asynchronous.

9. A method comprising:
   receiving requests to access shared memory resources at a shared multiport memory controller of a microcontroller from a plurality of high performance peripherals through a first interconnect matrix of the microcontroller and from a plurality of limited bandwidth peripherals through a second interconnect matrix of the microcontroller; and
   routing access to the shared memory resources according to a scheduling algorithm in response to receiving the requests,
   wherein routing access includes routing access of one of the plurality of high performance peripherals to a shared high performance memory resource through the first interconnect matrix when the shared high performance memory resource is not busy, and routing access of one of the plurality of limited bandwidth peripherals to a shared limited bandwidth memory resource through the second interconnect matrix when the shared limited bandwidth memory resource is not busy.

10. The method of claim 9, wherein routing access includes coupling a microprocessor to a slave port of the first interconnect matrix.

11. The method of claim 10, wherein the microprocessor is a 64-bit core processor.

12. The method of claim 9, further comprising coupling one of the slave ports of the first interconnect matrix to one of the master ports of the second interconnect matrix.

13. The method of claim 12, wherein coupling includes coupling one of the slave ports of the first interconnect matrix to one of the master ports of the second interconnect matrix using a bridge.

14. The method of claim 13, wherein the bridge is a 64-bit to 32-bit bridge.

15. The method of claim 9, wherein the first interconnect matrix is a 64-bit interconnect matrix and the second interconnect matrix is a 32-bit interconnect matrix.

16. The method of claim 9, further comprising:
   operating the first interconnect matrix and the plurality of high performance peripherals at a first frequency;
   operating the second interconnect matrix and the plurality of limited bandwidth peripherals at a second frequency; and
   operating the shared multiport controller at a third frequency,
   wherein the first frequency, the second frequency, and the third frequency are asynchronous.

* * * * *